UNITED STATES PATENT OFFICE.

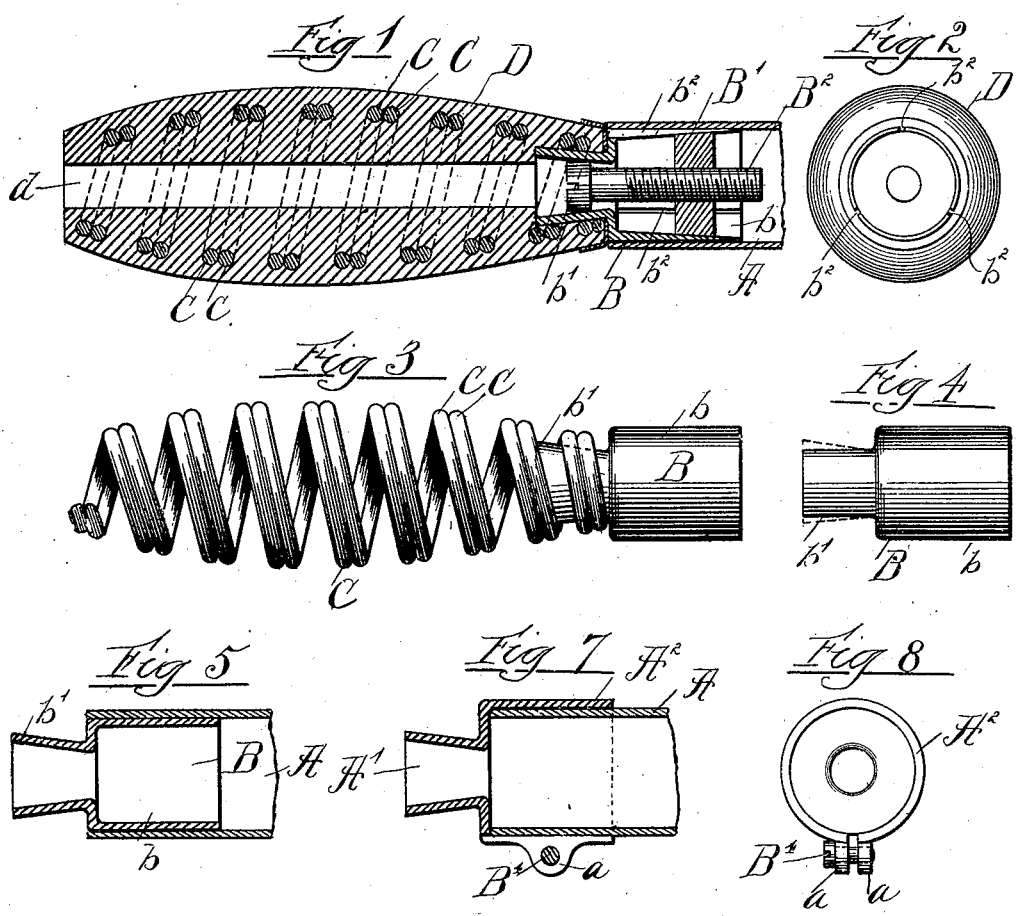

WILLIAM M. MORSE, OF CHICAGO, ILLINOIS.

HAND-GRIP.

SPECIFICATION forming part of Letters Patent No. 578,021, dated March 2, 1897.

Application filed February 8, 1896. Serial No. 578,565. (No model.)

*To all whom it may concern:*

Be it known that I, WILLIAM M. MORSE, of Chicago, in the county of Cook and State of Illinois, have invented certain new and useful Improvements in Hand-Grips; and I do hereby declare that the following is a full, clear, and exact description thereof, reference being had to the accompanying drawings, and to the letters of reference marked thereon, which form a part of this specification.

This invention relates to improvements in devices for absorbing the vibration in machines and vehicles, and since it is applicable to a variety of applications I will content myself with illustrating its use in connection with the grip of a bicycle "handle-bar."

The principal features of mechanism employed are a rigid part of the machine or vehicle and a resilient part so connected to the rigid part that the union shall be secure and rigid while at the same time resilient.

The precise nature of the invention will be better understood by reference to the accompanying illustrations and the description thereof and will be more particularly pointed out in the appended claims.

In the drawings I have illustrated, in Figure 1, an axial sectional view of the grip or handle of a bicycle or the like embodying one form of my invention. Fig. 2 is an end view of the same, looking at the socket end. Fig. 3 is a side elevation of the spiral spring forming the support about which the rubber is molded and the thimble upon which it is secured in position therein. Fig. 4 is a view of the thimble, showing the form of the latter before it has been expanded. Fig. 5 is an axial sectional view of a modified construction of the thimble. Fig. 6 is a side elevation of a modification in which both ends of the thimble are split. Figs. 7 and 8 illustrate in vertical, sectional, and end views, respectively, still another modification of the thimble.

Referring now to Figs. 1 to 4, inclusive, let A represent the end of any suitable rigid part of the machine, such as, for example, the handle of some implement or the steering-arm or handle-bar of a bicycle, and which part A may be tubular, square, or of other configuration.

B represents a thimble having an enlarged part $b$ and a reduced part $b'$. The large part $b$ will be of such exterior conformation as will admit of its being inserted within the hollow end of the rigid part A of the machine or vehicle. The interior of the part $b$ of the thimble will be reamed out upon a taper or angle, as clearly shown in Fig. 1, for the reception of a tapered nut B'. The part $b$ will also be split longitudinally, as clearly indicated at $b^2$. It will be manifest, therefore, that after the part $b$ is inserted within the part A if the wedge-shaped or tapered nut B' be drawn inwardly the several parts or segments of the part $b$ will be spread so as to cause their exterior surfaces to have a rigid frictional contact with the interior surface of the part A. Such inward movement of the nut B' is caused by a screw-bolt $B^2$, which is inserted through the apertured part $b'$, as indicated in Fig. 1.

C represents a coiled spring having one end wound about the reduced portion $b'$ of the thimble. There may be a plurality of such springs, and I have shown two springs C C, as I deem this the preferable construction; but I do not desire to be limited thereto, as a single spring in some instances is necessary, while in other instances it may be necessary to use two or more springs. After the end of the spring or springs C is properly secured upon the part $b'$ of the thimble I secure said spring to said thimble by inserting any well-known form of tapered punch within the end of said part $b'$ and expanding the latter, as indicated by the dotted lines in Fig. 4, into the conical or wedge-shaped form illustrated in Figs. 1, 3, 7, and 8. It will be manifest that the spring will be held properly to the thimble by the spread or expansion of the part $b'$. I next cover the spring C with any suitable resilient covering D, preferably rubber, formed in a mold, so as to give the desired shape to the handle. This rubber D will preferably be arranged to envelop the coil C both exteriorly and interiorly to a suitable thickness, so as to form a continuous flexible covering for the coil. In the preferred form herein shown this rubber covering will not be made solid, but will be provided with a central cavity $d$, extending throughout the entire length of the coil, such cavity serving the double purpose of reducing the weight and quantity of material employed and at the same time affording access to the interior of the device for the purpose of manipulating the screw-bolt B².

In Fig. 6 I have shown a slightly-modified form of thimble in which both parts thereof are split longitudinally for some distance inward from each end, so that it may be expanded by means of a suitable expanding device. Said thimble will preferably be constructed of resilient material, so as to have a tendency to resume its normal cylindric form when the expanding device is removed. In this instance instead of swaging the tubular stud or support, with which the coil is engaged, outwardly within the latter by means of a swaging-tool I provide a flaring removable head or washer B³ upon the screw B², which acts to expand the end of the thimble firmly within the end of the coil simultaneously with the expansion of the larger end of the thimble by the tapering nut B'. This construction is deemed a very desirable one, inasmuch as it enables the device to be removed from the vibratory part and replaced thereon at will by simply loosening or tightening the screw-bolt B². Furthermore, such a construction enables the supporting-stud to be further expanded at any subsequent time should the coil tend to become loosened by use, so that a perfectly rigid connection at all times is assured.

In Figs. 7 and 8 I have shown a thimble the reduced end A' of which is like that shown in Figs. 1, 2, and 3, while the larger end A² has the form of a ring-clamp or split socket adapted to embrace a corresponding part on the machine. Said larger part A² is provided at its lower side with apertured lugs or ears $a$ $a$, through which is inserted a clamping-bolt B⁴ in a familiar manner.

While I have herein shown what I deem to be the preferred embodiment of the invention, yet it will be obvious that various modifications may be made without departing from the spirit of the invention and without involving more than ordinary mechanical skill. I do not therefore wish to be limited to the precise details shown, except as made the subject of specific claims.

I claim as my invention—

1. The combination with a bicycle handle-bar, of a handle, comprising an elongated open coil of spring-wire, rigidly attached to the end of the handle-bar and forming an elastic prolongation thereof, and a mass of yielding material enveloping the coil both exteriorly and interiorly of the same.

2. The combination with a bicycle handle-bar, a handle comprising a supporting-stud rigidly secured to the end of the handle-bar, an elongated open coil of spring-wire surrounding and rigidly attached to the stud so as to form an elastic prolongation of the handle-bar, and a mass of yielding material enveloping the coil both exteriorly and interiorly of the same.

3. A device for absorbing vibration comprising a support provided with a tubular stud adapted to be expanded into outwardly-flaring form, rigidly secured to the vibratory part, a helical coil of spring-wire contracted at one end and engaged with the exterior of said tubular stud and a continuous cushioning covering inclosing said coil.

4. A device for absorbing vibration comprising a double-ended thimble one end of which forms a tubular stud adapted to be expanded into outwardly-flaring form and the other end of which forms an attaching device adapted to be expanded or contracted into rigid engagement with the vibratory part, a helical coil of spring-wire having the form of an elongated oval, within one end of which said tubular stud is expanded and a continuous cushioning covering inclosing said coil and supporting-stud.

5. A device for absorbing vibration comprising a double-ended thimble, each end of which is split longitudinally for a portion of its length, a coil of spring-wire one end of which is engaged with one of the thimble ends, a continuous elastic covering enveloping said coil and means for expanding both thimble ends, one within said coil and the other within any suitable socket on the vibratory part, substantially as described.

6. A device for absorbing vibration comprising a double-ended thimble, each end of which is split longitudinally for a portion of its length, a coil of spring-wire one end of which is engaged with one of the thimble ends, a continuous elastic covering enveloping said coil and means for simultaneously expanding both thimble ends, one within said coil and the other within any suitable socket on the vibratory part, comprising a conical or flaring end within one part of the thimble, a conical or flaring washer within the other part of the thimble and a screw-bolt or head which engages said washer and the stem of which engages said end, substantially as described.

In testimony that I claim the foregoing as my invention I affix my signature, in presence of two witnesses, this 6th day of February, A. D. 1896.

WILLIAM M. MORSE.

Witnesses:
TAYLOR E. BROWN,
ALBERT H. GRAVES.